Oct. 20, 1936. W. J. MAILHOIT 2,057,962
DISPLAY MEMBER
Filed July 3, 1935

INVENTOR.
WILFRED J. MAILHOIT.
BY
ATTORNEYS.

Patented Oct. 20, 1936

2,057,962

UNITED STATES PATENT OFFICE 2,057,962

DISPLAY MEMBER

Wilfred J. Mailhoit, South Bend, Ind.

Application July 3, 1935, Serial No. 29,652

3 Claims. (Cl. 65—15)

This invention relates to a display member, and particularly to a member for displaying meats and the like in retail stores.

The conventional display practice in meat markets is to place cuts of meat in a flat bottomed tray whose side walls are considerably higher than the thickness of a single cut of meat. Therefore, in order to obtain a good display, the cuts of meat must be piled one upon another in the tray to obtain the desired display effect. This practice is objectionable in several respects, namely, that a large proportion of the cuts of meat in the pile do not receive the full effect or benefit of the refrigeration of the display cabinet or show case, and that such unrefrigerated cuts of meat lose their fresh appearance if they are not sold soon after being cut.

It is therefore the primary object of this invention to provide a display member by which single cuts of meat may be displayed to full advantage.

A further object is to provide a display member for meat constructed to take full advantage of refrigeration.

A further object is to provide a meat display member having an elevated meat supporting surface.

A further object is to provide a meat display member having a marginal groove for collecting meat juices at points remote from the meat and substantially concealed from ordinary view.

A further object is to provide a meat display member having a chamber below the meat supporting portion thereof and constructed to provide circulation of air through said chamber.

Other objects will be apparent from the description and the appended claims.

Figure 1:
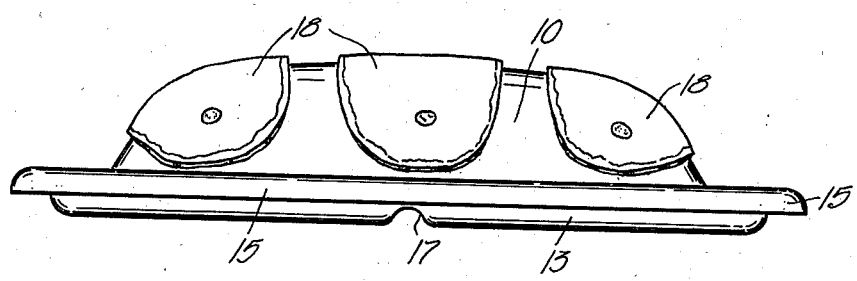
Figure 1 is a side view of the display member.
Figure 2:
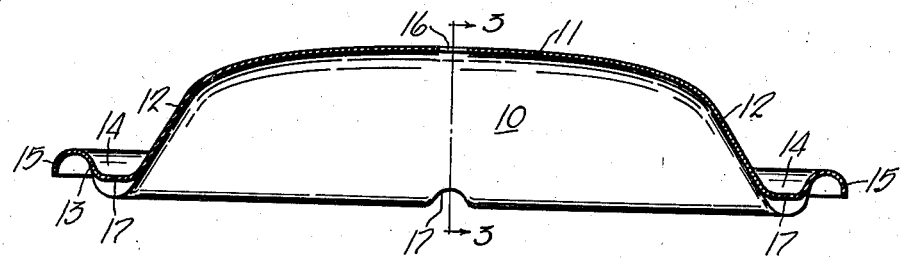
Figure 2 is a vertical longitudinal sectional view taken on line 2—2 of Figure 3.
Figure 3:
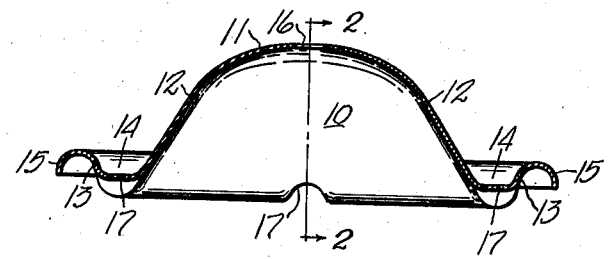
Figure 3 is a vertical transverse sectional view taken on line 3—3 of Figure 2.

Referring to the drawing, the numeral 10 designates the meat supporting portion of the display member which comprises a central convex portion or dome 11, and integral marginal angularly downwardly and outwardly extending walls 12 with which portion 11 merges in a natural curve. The lower marginal portions of the walls 12 are outwardly upwardly return bent at 13 to provide a marginal channel or groove 14 upon which the display member rests. A marginal downwardly outwardly extending trim flange 15 is formed integrally with portions 12. The display member is preferably formed of sheet metal, as by stamping, and its shape renders it of sturdy reinforced construction. The height of the central portion 12 is preferably at least twice the height of the marginal walls 13, and the extent of convexity of portion 11 and the angle of walls 12 is such as to present an attractive appearance when the meat is placed thereon as illustrated in Figure 1, whereby the single cuts of meats are displayed to the best advantage.

One or more openings 16 are formed in the meat supporting portion 10 of the member, preferably centrally of portion 11, whereby said opening is located at or adjacent the point of greatest height of the display member. The return bent or channel portion 14 of the member is provided with one or more upward offsets 17, which interrupt the marginal supporting surface of the display member. This construction permits circulation of air beneath the meat supporting portion 10 of the member, the offsets 17 forming intakes for the air of lowest temperature, and the opening 16 forming an outlet for the air of highest temperature. The air circulation thus afforded insures maximum cooling action on the portion 10 of the member for cooling the bottom of the meat, all other surfaces being directly exposed to the action of the cooling air in the refrigerating show case or the like.

It will thus be seen that single cuts 18 of meat, when laid upon portion 11 and walls 12, present a very attractive and sales-stimulating appearance. The juices which may exude from the meat will flow down into the groove or grooves 14, where they remain substantially hidden by the outer marginal walls 13. The elevation of central portion 10 of the member permits the cold air, which is of lowest temperature at the bottom of the refrigerated show case upon whose bottom the member rests, to act upon the under side of the metal plate meat supporting portion and to circulate thereagainst, to effectively keep the bottom surface of the meat cool. Also, in use of this member, quick sale of a meat cut is not necessary to prevent loss of the fresh sales-attracting appearance of the meat, inasmuch as all of its surfaces are at all times acted upon, either by cool air, or by a cool member upon which it bears.

I claim:—

1. A meat display member comprising a marginal U-shaped portion including inner and outer walls, said inner walls extending angularly inwardly and upwardly and merging with an integral and a central upwardly convex portion with which said inner walls cooperate to attractively display a cut of meat, the height of said central portion being at least twice the height of said outer walls to expose the meat supporting portion of the member and conceal only the lower concave U-shaped portion thereof, said member being formed of uniform comparatively thin heat conducting material and means for providing air circulation in the space beneath the meat supporting portion of said member.

2. A concavo-convex sheet metal meat display member supported at its marginal edges and having at least one marginal passage through which air may pass into the space therebeneath and an opening adjacent its center through which air may escape to provide air circulation traveling from the margin to the center and along the lower surface of said member to cool said member when meat is laid upon the convex surface thereof.

3. A sheet metal meat display member comprising a central concavo-convex portion and a marginal outwardly return bent flange, said member being supported at said return bend, said return bend being interrupted by an upward off-set, said central portion having an opening adjacent its center, whereby cool air may pass into the space beneath the central portion of said member and out through said opening to cool said central portion when meat is laid thereon, said return bend serving to collect juices from the meat at the margin of said member and substantially hidden by said flange.

WILFRED J. MAILHOIT.